UNITED STATES PATENT OFFICE.

LEWIS S. CHICHESTER, OF NEW YORK, ASSIGNOR TO JOHN J. TYLER, OF BROOKLYN, N. Y.

IMPROVEMENT IN CEREAL FOOD.

Specification forming part of Letters Patent No. 184,837, dated November 28, 1876; application filed January 31, 1876.

*To all whom it may concern:*

Be it known that I, LEWIS S. CHICHESTER, of the city and State of New York, have invented an Improvement in Cereals, of which the following is a specification:

In their preparation for sale, cereals have been subjected to processes of torrefaction, also to the action of steam, and in a ground or crushed condition to baking operations. These modes of treatment injure the flavor and the nutritive value of the cereals so treated.

The natural flavor peculiar to the different cereals is destroyed by the process of torrefaction and baking.

When steam is employed in the preparation of the whole cereal, it must necessarily be of a high temperature to penetrate and act efficiently upon the inner portion of the kernels under treatment. The heat of such steam is much greater than would be required for the ordinary process of boiling.

Food prepared from cereals so treated is thereby rendered tasteless, besides losing a portion of its actual nutritive properties, because some of the soluble elements are carried away by the steam, and also by the vapor of the water, during the subsequent drying process.

My improvement relates to a new article of manufacture, consisting of a completely cooked cereal containing all the nutritive elements or properties of such cereal, enriched or enhanced, but said cereal is in a desiccated condition when offered for sale, and the insoluble and indigestible starch is changed into soluble and digestible sugar, and the whole completely prepared for easy digestion in the human stomach; and, furthermore, the flavor of the food is enriched and made sweeter than it can be by the ordinary process of boiling, and the condition of these cereals is such that they will not be injured by subsequent exposure to ordinary atmospheric changes.

In order to prepare my cereals, the kernels are crushed or ground, and exposed in a vessel to the action of hot vapor or moist steam at low temperature, supplying just moisture enough to do the work.

When the mass is partially cooked, the supply of steam is then cut off, but the heat is continued to the vessel till the thorough cooking operation is completed, then the mass is dried by agitation and a current of air. These means are set forth in a pending application.

Cereals prepared by my process possess the following properties that distinguish them from all other prepared cereals: The natural appearance of the cereals is maintained. The sweetness of the cereal is increased, in consequence of the action of the heat on the starch and gluten. The natural flavor is retained and increased.

My cereals are in a thoroughly-cooked condition, and can be prepared for use in a few minutes. My cereals are thoroughly desiccated, rendering a given bulk lighter than other cereals. My cereals will keep perfect in all climates.

A sick person or child fed from my cooked cereals is sure of wholesome material instead of receiving only partially-cooked food, as is often the case from carelessness or ignorance. Thereby a great cause of sickness and debility is removed, as my cereals are always in a wholesome condition when offered for sale, because they have been thoroughly cooked at or about the temperature of boiling water; hence my improved articles of manufacture possess great utility over any cereal preparations that have heretofore been put upon the market.

I do not herein lay any claim to the process or the apparatus employed in preparing cereals, the same being set forth in Letters Patent Nos. 153,240 and 173,211, heretofore granted to me.

I claim as my invention—

The described food consisting of the crushed or ground cereal in a cooked, dried, and unscorched condition, as a new article of manufacture.

Signed by me this 28th day of January, A. D. 1876.

LEWIS S. CHICHESTER.

Witnesses:
 GEO. T. PINCKNEY,
 CHAS. H. SMITH.